United States Patent Office 3,477,979
Patented Nov. 11, 1969

3,477,979
EPOXY CONTAINING CONCRETE
Martin J. Hillyer, Walnut Creek, Calif., assignor to Shell Oil Company, New York, N.Y., a corporation of Delaware
No Drawing. Filed Nov. 26, 1965, Ser. No. 509,933
Int. Cl. C04b 13/24
U.S. Cl. 260—29.2    5 Claims

ABSTRACT OF THE DISCLOSURE

Concrete compositions are disclosed. These compositions comprise cement, aggregate and an epoxy resin composition which contains a polyepoxide, an epoxy curing agent and a petroleum hydrocarbon fraction containing over 55% by weight aromatics.

---

This invention relates to the improvement of concrete. More particularly, the invention relates to improvement of the chemical and mechanical properties of concrete by the incorporation therein of epoxy resin compositions.

Concrete is the most widely used construction material in the world today. Reasons for such a large-scale use include low cost and availability as well as its mechanical properties and ease of being cast into practically any desired shape and size. However, concrete also has certain characteristics and deficiencies which limit or preclude its use in a number of applications.

In the casting of concrete articles and structures water is added to the mixture of aggregate and cement to give it the desired consistency and plasticity for handling and working as well as to completely hydrate the cement. The water then evaporates from the poured or shaped concrete, leaving the hardened concrete structure. However, the concrete loses or takes on moisture according to the water content of the surrounding environment which accordingly causes a shrinking or swelling of the structure. Additionally, different temperature conditions cause the concrete to swell or shrink. Due to the relatively low tensile strength of the concrete, such variations in moisture content and temperature often causes the structure to crack, curl, warp, etc. In practice, contraction joints are often used to prevent such degradation and deformation of concrete but this measure is expensive and time consuming both at the time of construction and in subsequent maintenance. As a result, it is often considered more economically advantageous to repair concrete than to prevent its deformation by using contraction joints.

A very successful way of reducing temperature strain in concrete structures is to incorporate steel within the concrete itself. However, such steel reinforcement is of little value in eliminating degradation caused by moisture.

Concrete is often used in instances where it is exposed to harsh corrosive action caused by weather conditions or the action of chemicals such as deicing salts and the like. This is especially true where concrete or concrete lined pipes are used to conduct chemically corrosive materials. Concrete is often used in lieu of metal or in coating metal pipes to reduce corrosion and hydraulic friction, but due to its composition, it has not proven altogether satisfactory since concrete has poor resistance to some chemicals.

In order to improve the characteristics and overcome some of the weaknesses of concrete set forth above various methods have been attempted. One of the best practices has been to utilize a cured epoxy resin in the cement composition used to prepare the concrete. While the epoxy resin greatly improves the tensile strength and chemical resistance of concrete, it has not proven altogether satisfactory.

Epoxy resin modified concrete may be brittle rather than more flexible and tensile due to the nature of the cured epoxy resins, and in many instances these resins have little or even a slightly negative affect on the compressive properties of the concrete in which they are used. Since in preparing concrete, water is used in rather large amounts to hydrate the cement and to provide a workable consistency, in which water the epoxy resin material is insoluble and even often incompatible, there often results poor mixtures and uneven distribution of the resin throughout the cement composition.

It is an object of this invention to provide a concrete composition having improved strength. It is also an object to provide concrete which has resistance to corrosion and other chemical degradation. It is another object of the invention to provide a resin-containing concrete which has improved flexibility, tensility and compressability. These and other objects will be apparent from the following description.

The compositions of this invention comprise a concrete prepared from a mixture of a cement such as a hydrated portland cement, water, aggregate and an epoxy resin composition.

The improved concrete compositions of the invention are those utilizing any of the known cements such as portland cement, calcium aluminate cement, magnesia cement, etc. Portland cement is particularly preferred due to its availability and low cost and the improvement thereof by incorporation of the epoxy resin composition. In the interest of simplicity and clarity, the description of this invention for the most part, is confined thereto, although it will be understood that the invention is more widely applicable as has been stated. By portland cement as used herein is intended those hydraulic cements the essential ingredients of which are the calcium silicates, tricalcium silicate and dicalcium silicate. Other materials such as compounds of lime, alumina, iron oxide, magnesia, sodium, potassium, and sulfur are also generally present. The actual composition of various portland cements may vary somewhat depending on the source of the basic materials from which it is prepared as is well known to those skilled in the art.

In preparing the concrete it is necessary to use an aggregate in the composition. The aggregate may be of very small size such as very fine sand up to larger materials such as rocks, broken stone and the like. The size of aggregate used will depend on the coarseness and/or consistency of the concrete desired which in turn depends on the intended use of the structure to be produced. Natural rock materials such as sand, gravel and/or stone are most commonly used as aggregate. Special materials such as cinders, burned clay, pumice, coral, vermiculite, granulated slag and the like may also be used. The size, amount and surface texture or grade of the aggregate have some influence on the strength of the concrete. The ratio of aggregate and cement is especially important in determining the concrete strength. Generally, a weight ratio of aggregate to cement of between about 2:1 and 10:1, respectively, is suitable for most purposes.

The epoxy resin composition used in preparing the concrete is composed of a polyepoxide, an epoxy resin curing agent, and an aromatic hydrocarbon.

The polyepoxides used comprise those organic materials possessing more than one vic-epoxy (oxirane) group

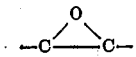

per molecule. The polyepoxides may be saturated or unsaturated, aliphatic, cycloaliphatic, aromatic or heterocyclic and may be substituted with no-interfering substituents such as chlorine, alkoxy groups, etc. They may be monomeric or polymeric.

For clarity, many of the polyepoxides and particularly those of the polymeric type will be described in terms of epoxy equivalent values, which refers to the average number of epoxy groups contained in the average molecule. The value is obtained by dividing the average molecular weight of the polyepoxide by the epoxide equivalent weight and as described in U.S. 2,633,458.

If the polyepoxide material is a single compound having all of the epoxy groups intact, the epoxy equivalent value will be an integer, such as 2, 3, 4 and the like. However, in the case of polymeric polyepoxides the material may contain some of the monomeric epoxide or have some of the epoxy groups hydrated or otherwise reacted and/or contain macromolecules of various molecular weights, so that the epoxy equivalency may be quite low and include fractional values greater than 1.0. Another suitable description of epoxide content of an epoxy compound is in terms of epoxy equivalents per 100 grams.

The monomeric polyepoxide compounds may be exemplified by the following: vinyl cyclohexene dioxide, epoxidized soybean oil, butadiene dioxide, 1,4-bis(2,3-epoxypropoxy)benzene, 1,3 - bis(2,3-epoxypropoxy)benzene, 4,4'-bis(2 - epoxypropoxy)diphenyl ether, 1,8-bis(2,3-epoxypropoxy)octane, 1,4-bis(2,3 - epoxypropoxy)cyclohexane, 4,4'-bis(2 - hydroxy - 3,4 - epoxybutoxy)diphenyldimethylmethane, 1,3 - bis(4,5 - epoxypentoxy)-5-chlorobenzene, 1,4-bis(3,4-epoxybutoxy) - 2 - chlorocyclohexane, diglycidyl ether, 1,3-bis(2-hydroxy - 3,4 - epoxybutoxy)benzene, 1,4-bis(2-hydroxy - 4,5 - epoxypentoxy)benzene, 1,2,5,6-di-epoxy - 3 - hexene, 1,2,5,6-diepoxyhexane, and 1,2,3,4-tetra(2-hydroxy-3,4-epoxybutoxy)butane.

Other examples of this type include the glycidyl polyethers of the polyhydric phenols obtained by reacting a polyhydric phenol with a great excess, e.g., 4 to 10 mol excess, of a halogen-containing epoxide in an alkaline medium. Thus, Polyether A as described in U.S. 2,633,458 to Shokal, which is a concentrate of 2,2-bis(2,3-epoxypropoxyphenyl)propane, is obtained by reacting bisphenyl-A, (2,2-bis(4-hydroxyphenyl)propane) with an excess of epichlorohydrin. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydrobenzophenone, bis(4-hydroxyphenyl)ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like. Another very suitable group of epoxides comprises epoxidized cyclohexane compounds containing at least two epoxycyclohexyl rings. Typical of these are 3,4 - epoxycyclohexylmethyl - 3,4-epoxycyclohexane-carboxylate and the corresponding homologs having alkyl substituents in the cyclohexane rings. These and related compounds are described in substantial detail in U.S. Patents 2,890,194 through 2,890,197 and in U.S. 2,917,469.

Another very suitable group of epoxides comprising the polyglycidyl ethers of tetraphenols is described in U.S. 2,806,016 to Schwarzer. Typical of these is the polyglycidyl ether of 1,1,2,2-tetrakis(hydroxyphenyl)ethane described in Example I of said patent, which has a melting point of about 85° C. and contains 0.452 epoxy equivalent per 100 grams. Examples of the polymeric polyepoxides, include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl) ether, the reaction product of pentaerythritol and 1,2-epoxy-4,5-epoxypentane, and the reaction product of bisphenol and bis(2,3-epoxy-2-methylpropyl)ether, the reaction product or resorcinol and bis(2,3-epoxypropyl) ether, and the reaction product of catechol and bis(2,3-epoxypropyl)ether.

A further group of polymeric polyepoxides comprises the hydroxy-substituted polyepoxypolyethers obtained by reacting, preferably in an alkaline medium, a slight excess, e.g., 0.5 to 3 mol excess, of a halogen-containing epoxide as described above, with any of the aforedescribed polyhydric phenols, such as resorcinol, catechol, bisphenol, bis(2,2'-dihydroxy-dinaphthyl)methane, and the like.

Also included within this group are the polyepoxide polyethers obtained by reacting, preferably in the presence of an acid-acting compound, such as hydrofluoric acid, one of the aforedescribed halogen-containing epoxides with water or a polyhydric alcohol, such as glycerol, propylene glycol, ethylene glycol, trimethylene glycol, butylene glycol, and the like, and subsequently treating the resulting product with an alkaline component as described in U.S. Patent No. 3,058,921 to Pannell.

Other polymeric polyepoxide compounds include the polymers and copolymers of the epoxy-containing monomers possessing at least one polymerizable ethylenic linkage. When such monomers are polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, butadiene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxypropyl ether), poly(2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxy-styrene).

Other particularly suitable polyepoxides include the condensation products of polycarboxylic acids, polycarboxylic acid anhydrides and mixtures thereof with from 1.5 to four times the chemical equivalent amount of a polyepoxide containing more than one vic-epoxy group, the equivalent amount referring to the amount needed to furnish one acid group per epoxy group. The preparation of such compounds and the various starting materials from which they can be prepared are described in U.S. 2,970,983 to Newey. A representative general formula of these compounds, when prepared from dibasic acids, is as follows:

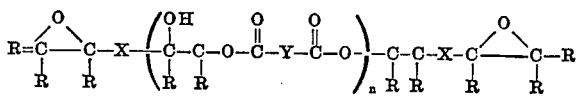

wherein R is hydrogen or hydrocarbon radical, X is organic radical, Y is residue or the dibasic acid and $n$ is an integer and preferably 1 to 10. Particularly preferred are the condensation products of dimer or trimer acids obtained by polymerizing unsaturated fatty acids such as soybean oil fatty acids and the like with diepoxides of the type of Polyether A of said U.S. 2,633,458 to Shokal.

A preferred group of epoxy-containing organic materials are the monomeric and polymeric glycidyl polyethers of dihydric phenols obtained by reacting epichlorohydrin with a dihydric phenol in an alkaline medium. The monomeric products of this type may be represented by the general formula

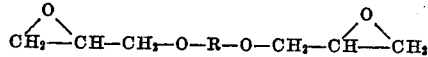

wherein R represents a divalent hydrocarbon radical of the dihydric phenol. The polymeric products will generally not be a single simple molecule but will be a complex mixture of glycidyl polyethers of the general formula

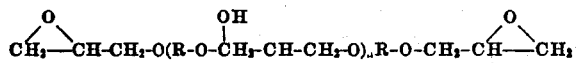

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of materials with one or both of the terminal glycidyl radicals in hydrated form. Molecular weights between about 250 and 900 are preferred.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Preferred polyepoxy derivatives of dihydric phenols are the reaction products of epichlorohydrin and 2,2-bis(4-hydroxyphenyl)propane. The simplest member of this group is the diglycidyl ether of the phenol, 2,2-bis(2,3-epoxypropoxyphenyl)propane, which is commercially available in the form of liquid concentrates containing from 70% to nearly 100% of the named product. The substantially pure compound has a viscosity of about 40 poises at 25° C., a molecular weight of about 340 and an epoxy value of about 0.59 equivalent per 100 grams, corresponding to an epoxy equivalency of about 2. A typical commercial concentrate of about 70–80% of the compound has a viscosity of about 125 to 175 poises at 25° C., a molecular weight of about 350 (measured ebullioscopically in ethylene dichloride), an epoxy value of about 0.50 equivalent per 100 grams and a corresponding epoxy equivalency of 1.75. It is illustrated as Polyether A in U.S. 2,633,458 to Shokal. Other polyepoxy derivatives of dihydric phenols are those of Formula 3 where R stands for —O—$C_6H_4(C_3H_6)C_3H_4$—O— and $n$ has average values above zero. For example, products in which the average value of $n$ ranges from 0 to about 4 are useful in this invention. Typical of solid products in this range are those having melting points of about 70° C. and about 98° C., molecular weights of about 900 and about 1400, and epoxide values of about 0.20 and about 0.103 equivalent per 100 grams, respectively. They are illustrated as Polyethers D and E in said Shokal patent.

The epoxide curing agent may be one of a great variety of known epoxy curing agents. Examples of suitable curing agents are alkalies such as sodium or potassium hydroxide; alkali phenoxides like sodium phenoxide; carboxylic acids or anhydrides, such as phthalic anhydride, tetrahydrophthalic anhydride; Nadic methyl anhydride, chlorendic anhydride, pyromellitic anhydride, trimellitic anhydride, succinic anhydride, maleic anhydride, octadecenylsuccinic anhydride, etc. and mixtures thereof; dimer or trimer acids derived from unsaturated fatty acids, 1,20-eicosanedioic acid, and the like; Friedel-Crafts metal halides, such as aluminum chloride, zinc chloride, ferric chloride; or boron trifluoride as well as complexes thereof with ethers, acid anhydrides, ketones, diazonium salts, and those disclosed in U.S. 2,824,083; salts such as zinc fluoborate, magnesium perchlorate, zinc fluosilicate; phosphoric acid and partial esters thereof including n-butyl orthophosphate, diethyl ortho-phosphate and hexaethyltetraphosphate; aliphatic, aromatic and heterocyclic amino compounds, such as, for example, diethylene triamine, triethylene tetramine, tetraethylene pentamine, dicyandiamide, melamine, pyridine, cyclohexylamine, benzyldimethylamine, benzylamine, diethylaniline, triethanolamine, piperidine, tetramethylpiperzine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2,4-diamino-2,6-diethyloctane, dibutylamine, dioctylamine, dinoylamine, distearylamine, diallylamine, dicyclohexylamine, methylethylamine, ethylcyclohexylamine, pyrrolidine, 2-methylpyrrolidine, tetrahydropyridine, 2,6-diaminopyridine, diamino-diphenylmethane, p,p'-aminodiphenylsulfone, triaminobenzene, ortho-, para-, and metaphenylene diamine, methylene dianiline, diaminotoluene, diamino-diphenyl, diamino-stilbene, 1,3-diamino-4-isopropyl benzene and the like, and soluble adducts of amines and polyepoxides and their salts, such as described in U.S. 2,651,589 and U.S. 2,640,037.

Especially preferred curing agents to be employed because of their effectiveness in the presence of water are the polyamides containing active amino and/or carboxyl groups and preferably those containing a plurality of amino hydrogen atoms and prepared by reacting polybasic acids with polyamine such as described in U.S. Patents 2,450,940 and 2,695,908. Examples of polybasic acids used include among others, 1,10-decanedioic acid, 1,12-dodecanedienedioic acid, 1,20-eicosanedienedioic acid, 1,14-tetradecanedioic acid, 1,18-octadecanedioic acid and dimerized and trimerized fatty acids such as dilinoleic acid and the like. Amines used in making the polyamides include preferably the aliphatic and cyclialiphatic polyamines as ethylene diamine, diethylene triamine, triethylene tetramine, tetraethylene pentamine, 1,4-diaminobutane, 1,3-diaminobutane, hexamethylene diamine, 3-(N-isopropylamino)propylamine, etc. Especially preferred polyamides are those derived from aliphatic polyamines containing no more than 12 carbon atoms and polymeric fatty acids obtained by dimerizing and/or trimerizing ethylenically unsaturated fatty acids containing up to 25 carbon atoms. Such preferred polyamides have a viscosity between 10 and 750 poises at 40° C. and preferably between 20 and 250 poises at 40° C. and have an amine value of 50 to 450.

The hydrocarbon used in the compositions of the invention are aromatic hydrocarbons which are compatible with the polyepoxides. Preferred hydrocarbons are the highly aromatic, low viscosity, low volitility petroleum fractions such as thermally cracked residues, high boiling fractions of catalytically cracked gas oil, boiling fractions of cracking cycle stocks, residues from pyrollysis of residual petroleum fuel oils used in the production of gas and the like, and highly aromatic extracts of distillate oils used in making lube oils. Preferred members of the latter group include the high boiling extracts obtained by use of non-reactive highly polar, aromatically preferential solvents such as liquid sulfur dioxide, phenol, cresylic acid, beta, beta-dichloroethyl ether, nitrobenzene, etc. The use of the so-called double solvent process employing mutually immiscible solvents like cresylic acid and propane also yields suitable extracts. The useful hydrocarbon fractions may contain paraffinic unsaturated and naphthenic compounds, but are predominantly aromatic, that is they contain above about 55% and preferably above 65% aromatics by weight. Viscosities of these materials may range from about 50 SSU at 100° F. to more than 2500 SSU at 210° F. In general, the most preferred petroleum hydrocarbon fractions have a viscosity-gravity constant (VGC) above 0.905 and boiling points above about 300° F. Mixtures of these hydrocarbons may also be used. It has been found unexpectedly according to the invention that the use of the aromatic hydrocarbon in preparing the concrete compositions increases the strength of the hardened concrete as compared to epoxy containing concretes which contain no hydrocarbon.

The proportions of ingredients used in preparing the cement compositions may be varied depending on the properties of the mixture desired and especially the handling characteristics as well as the properties of the final hardened concrete. A ratio of cement to aggregate between about 1:1 and 1:6 by weight respectively are generally suitable for most purposes. The type or mixtures of aggregate types will accordingly depend on the strength and appearance desired as is understood by those skilled in the art. Thus, for example, the aggregate may consist exclusively of sand or of mixtures of sand and pea gravel or larger aggregates, etc.

The actual composition of the epoxy resin composition may be varied as to proportions of polyepoxide, curing agent and aromatic hydrocarbon depending on the strengths desired as well as economic considerations. The amount of polyepoxide used is preferably between about 20 and 80% and more preferably between about 25 and 50% by weight of the total epoxy resin composition. The amount of curing agent present is preferably between about 1 and 50% by weight of the epoxy resin composition depending on the type of curing agent used. For the alkalies or phenoxides 1% to 40% by weight of the epoxy resin composition are generally suitable. The phosphoric acid and esters thereof are used between about 1 and 10%. Tertiary amine compounds are preferably used in amounts of 1 to 15%. The acids, anhydrides, polyamines and preferred polyamides are preferably used in at least 0.8 equivalent amounts, and preferably between 0.8 and 1.5 equivalent amounts. An equivalent amount refers to the amount needed to provide one active hydrogen (or anhydride group) per epoxy group. Thus, for this latter group of curing agents, amounts of between about 15 and 50% and preferably between and 15 and 30% by weight based on the resin composition are used.

As set forth above, the presence of the aromatic hydrocarbon surprisingly increases the strength of the concrete produced by this invention over compositions containing a cured polyepoxide, but containing no hydrocarbon. Suitable amounts of hydrocarbon to be used are between about 10 and 70% and preferably between about 20 and 50% by weight of the epoxy resin composition.

The total amount of epoxy resin composition used in preparing the cement mixture will vary depending on the strength of the concrete desired as well as economic considerations. Generally, an amount of epoxy resin composition between about 0.5 and 20% and preferably between 1 and 10% is suitable where Percent epoxy composition=

$$\frac{\text{weight epoxy composition}}{\text{weight cement} + \text{weight aggregate}} \times 100$$

Water is added to the cement mixture to provide for hydration of the cement and to give the mixture the desired plasticity. Generally, due to the liquid epoxy resin composition present, less water is necessary to give a suitable workable cement mixture than is generally used where no epoxy resin composition is present. Accordingly, the water/cement ratio of between about 1:1 and 1:5 and preferably 1:2 to 1:4 by weight respectively is suitable for the preparation according to the invention.

Any suitable and convenient manner and order to mix the materials may be used generally. However, it is desirable and advantageous to prepare the epoxy resin composition separately and then add it to the cement and aggregate mixture and thereafter add the water until the desired plasticity is obtained. It has also been found that very desirable compositions are produced where the epoxy resin composition is prepared separately and allowed to cure for a period of time prior to adding it to the cement-aggregate mixture. Curing temperatures between about 60° F. and 150° F. for from ½ to 5 hours are suitable, the higher temperatures requiring shorter periods for curing. However, such a curing of the epoxy resin composition is not essential especially where the temperature of the cement-epoxy mixture is maintained at temperatures which promote epoxide curing, i.e., above about 60° F., where the composition hardens.

The compositions of the invention due to their strength, flexibility and chemical resistance as well as other qualities mentioned herein may be used wherever concrete is called for.

The compositions are especially suitable in the preparation of structures where concrete of high tensile strength and weight advantage over steel reinforced concrete are necessary. Additionally, these concrete compositions have properties which provide for utilization in preparing conduits having outstanding resistance to chemicals and/or water.

The following examples are provided to illustrate the manner in which the invention is carried out. It is to be understood that the examples are for the purpose of illustration only and the invention is not to be regarded as limited to any of the specific compounds or conditions recited therein. Unless otherwise indicated, parts disclosed in the examples are given by weight.

EXAMPLE I

A cement composition was prepared as follows: 1504 grams of Portland cement type III, 3640 grams of top sand and 2280 grams of pea gravel were placed in a Hobart mixing bowl which bowl was placed in a mixer. Water (650 g.) was added and thoroughly mixed in after which the bowl was removed from the mixer and the concrete towelled into forms. The concrete was allowed to cure into bricks measuring 2" x 2" x 12" used for flexural and compressive strength tests and "dog-bones" as described in ASTM C190 used for tensile tests. The samples were covered with a Mylar sheet and cured for about 22 hours at 75° F., then released from the forms and cured additionally for 6 days at 75° F.

EXAMPLE II (a) The same procedure described in Example I was repeated with the exception that 500 g. of water was used and 325 g. (4.4%) epoxy resin composition was added to the wet cement mixture and mixed in the mixing bowl immediately after the water had been added and then thoroughly mixed. The epoxy resin composition consisted of 33.33% of a polyepoxide (Epon 828-Shell Chemical Company)

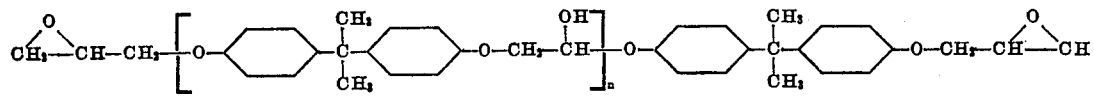

having an epoxide equivalent of 180–195 (grams of resin containing one gram equivalent of epoxide) and an average molecular weight of approximately 380, 20.0% of a polyamide curing agent Versamid 140 (General Mills) prepared from dilinoleic acid and ethylene diamine and having the amine value of 375 and a specific gravity (25° C./25° C.) of 0.97, and a mixture of aromatic hydrocarbons Dutrex 298 (Shell Oil Company) 16.67% and 30.0% Dutrex 739. Dutrex 298 and Dutrex 739 have the following properties:

|  | 298 | 739 |
|---|---|---|
| Viscosity: | | |
| SSU/100° F | 204 | 15,800 |
| SSU/210° F | 40 | 107 |
| Gravity, ° API | 11.3 | 5.2 |
| Specific gravity/60° F | 0.9909 | 1.0351 |
| Boiling range, ° F | 568–724 | 740–884 |
| Aniline Point, ° F | 22.5 | 13 |
| Viscosity Gravity Constant | 0.967 | 0.999 |
| Molecular Analysis, Clay-Gel, percent weight: | | |
| Polar compounds | 9.0 | 23.0 |
| Aromatics | 80.9 | 70.3 |
| Saturates | 10.1 | 6.7 |

The epoxy resin compositions were prepared by mixing the polyepoxide, the curing agent and hydrocarbon. The epoxy resin compositions were then reacted for one hour at 75° F. prior to their addition to the cement composition.

(b) The procedure of (a) was repeated except that the epoxy resin composition was not cured prior to addition to the cement compositions.

EXAMPLE III(a) AND (b)

The procedures of Example II(a) and (b) were repeated respectively with the exception that only 400 g. of water was used to mix the cement composition.

EXAMPLE IV(a) AND (b)

The procedure of Example II(a) and (b) respectively was repeated with Dutrex 298 used solely as the hydrocarbon.

EXAMPLE V(a) AND (b)

The procedure of Example IV(a) and (b) was repeated respectively with the use of 400 g. of water in preparing the cement mixture.

The hardened concrete samples prepared in the Examples I–V above were then tested for tensile strength on a Tinius-Olsen testing machine using a cross-head speed of 0.05 inch per minute. The results of the test are set forth in Table I.

TABLE I

| Example: | Tensile strength (percent of Example I) |
|---|---|
| I (control) | 100 |
| II(a) | 174 |
| II(b) | 139 |
| III(a) | 179 |
| III(b) | 154 |
| IV(a) | 165 |
| IV(b) | 160 |
| V(a) | 154 |
| V(b) | 149 |

The concrete samples prepared in Examples I–V were then tested for flexural strength according to ASTM C293. The results are set forth in Table II.

TABLE II

| Example: | Flexural strength (percent of Example I) |
|---|---|
| I (control) | 100 |
| II(a) | 173 |
| II(b) | 118 |
| III(a) | 197 |
| III(b) | 145 |
| IV(a) | 134 |
| IV(b) | 115 |
| V(a) | 153 |
| V(b) | 122 |

The concrete samples prepared in Examples I–V were tested for compressive strength according to ASTM C116 with the use of bearing blocks 2 inches square. The results are given in Table III.

TABLE III

| Example: | Compressive strength (percent of Example I) |
|---|---|
| I (control) | 100 |
| II(a) | 124 |
| III(a) | 145 |
| IV(a) | 112 |

The following examples and tests were made to show the general improvement of the concrete strength obtained by using the aromatic hydrocarbon containing compositions of the invention.

EXAMPLES VI AND VII

Concrete compositions VI and VII were prepared in the manner set forth in Examples II(a) and III(a) respectively with the exception that no hydrocarbon was present in the epoxy resin composition. The amount of epoxy resin composition used in each case was 4.4% based on the combined weight of the cement and aggregate. The resin composition in each case consisted of 62.5% polyepoxide and 37.5% polyamide curing agent thereby giving an increased amount of polyepoxide and curing agent as compared to Examples II(a) and III(a) wherein the resin composition contained hydrocarbon. The amounts of water used in the compositions of Examples VI and VII were the same as used in Examples II(a) and III(a), respectively.

The hardened concrete samples were then tested for tensile strength, flexural strength and compressive strength as in the previous tests. The results are set forth in Table IV.

TABLE IV

| Example | Hydrocarbon (percent weight) | Tensile Strength | Flexural Strength | Compressive Strength |
|---|---|---|---|---|
| I | 0 | 100 | 100 | 100 |
| VI | 0 | 118 | 187 | 108 |
| II(a) | 46.7 | 174 | 173 | 124 |
| VII | 0 | 98 | 185 | 79 |
| III(a) | 46.7 | 179 | 197 | 145 |

I claim as my invention:

1. A concrete composition comprising cement, aggregate and an epoxy resin composition consisting essentially of from about 20 to 80% by weight of a polyepoxide having more than one vic-epoxy group, about 1 to 50% by weight of an epoxy curing agent, and about 10 to 70% by weight of a petroleum hydrocarbon fraction having at least 55% by weight aromatics, a viscosity ranging from about 50 SSU at 100° F. to about 2500 SSU at 210° F., a viscosity-gravity constant above 0.905 and a boiling point above about 300° F., and wherein the cement:aggregate ratio is between about 1:1 and 1:6 by weight, the water:cement ratio is between about 1:1 and 1:5 and the epoxy resin composition is from about 0.5 to 20% of the combined weight of cement and aggregate.

2. A composition of claim 1 wherein the curing agent is an amino hydrogen containing polyamide of a polybasic acid and an aliphatic polyamine.

3. A composition of claim 1 wherein the polyepoxide is a glycidyl polyether of a polyhydric phenol.

4. A composition of claim 1 wherein the cement is hydrated Portland cement.

5. A composition of claim 1 wherein the epoxy resin composition is cured for about ½ to 5 hours at between about 60 and 150° F. prior to being mixed with the concrete.

References Cited

UNITED STATES PATENTS

| | | |
|---|---|---|
| 2,861,011 | 11/1958 | Asbeck. |
| 3,304,344 | 2/1967 | Szawlos. |
| 3,062,771 | 11/1962 | Boenau. |
| 3,284,400 | 11/1966 | Nelson. |
| 3,310,511 | 3/1967 | Reinert. |

FOREIGN PATENTS 950,298  2/1964  Great Britain.

MORRIS LIEBMAN, Primary Examiner

P. R. MICHL, Assistant Examiner

U.S. Cl. X.R.

106—90, 94; 260—33.6, 37